United States Patent Office 3,449,286
Patented June 10, 1969

3,449,286
PROCESS FOR THE PRODUCTION OF ACRYLONITRILE POLYMERS
Jeno Szita, Herbert Marzolph, and Otto Unger, Dormagen, Germany, assignors to Farbenfabriken Bayer Aktiengesellschaft, Leverkusen, Germany, a corporation of Germany
No Drawing. Filed June 15, 1966, Ser. No. 557,640
Claims priority, application Germany, June 23, 1965, F 46,408
Int. Cl. C08f *1/08, 1/62, 3/76*
U.S. Cl. 260—30.4           4 Claims

ABSTRACT OF THE DISCLOSURE

Process for producing polymers of acrylonitrile in the form of a spinning solution by polymerizing a composition containing 80–100% by weight of acrylonitrile and 0–20% by weight of an ethylenically unsaturated comonomer in an organic solvent in the presence of a redox catalyst system consisting of an organic peroxide, a sulphinic acid salt of an organic base, and a strong mineral acid. This process produces improved spinning solutions which are gel-free, are highly concentrated with polymer, and are anhydrous.

---

The present invention relates to the production of acrylonitrile polymers. More specifically the invention relates to a process for the preparation of a spinning solution of polymers or copolymers of acrylonitrile, whereby acrylonitrile, either alone or together with other ethylenically unsaturated compounds, is polymerised in organic solvents, preferably in dimethylformamide, in the presence of redox catalyst systems. The viscous solution obtained can be spun either immediately after polymerisation is terminated or after removal of unreacted monomer residues.

This process offers important advantages over the process in which polymerisation is carried out in an aqueous medium whereby the precipitated polymer must first be separated from the reaction medium, washed, dried and in some cases ground before it can be worked up with a suitable solvent to form a spinnable solution. These subsequent working up stages are, of course, eliminated in solution polymerisation, whereby the process is greatly simplified. Apart from the advantages in technical procedure, solution polymerisation leads to important improvements in quality, e.g. the production of spinning solutions that are completely gel-free, as well as the possibility of obtaining much higher solution concentrations than is possible merely by dissolving the polymer in an aqueous solvent. These properties have a particularly advantageous effect on the spinning procedure (easier filtration better spinning conditions).

However, the solution polymerisation process entails the following difficulties which have for a long time delayed its use on a large commercial scale:

(1) It has been found that commercially useful products can only be prepared by the use of radical polymerisation catalysts. Organic solvents suitable for this purpose, e.g. dimethylformamide, dimethylsulphoxide, ethylene carbonate and γ-butyrolactone, however, were found to have a high chain transfer capacity in the radical chain reaction. Owing to the high transfer constants of the solvents, only low molecular weight products can be obtained if the reaction velocities are high. In other words, the relatively high molecular weights required for fibre purposes (K-value above 75, H. Fikentscher, Cellulosechemie 13 (1952) 60) could only be obtained at low reaction velocities.

(2) There is a strong tendency for the polyacrylonitrile solutions to become discoloured. Long reaction times and in particular high reaction temperatures can lead to commercially useless or inferior products.

(3) It is only possible to use reagents that are completely soluble in the reaction medium and remain in solution in the course of polymerisation. For example, undissolved residues of catalyst or precipitated salts increase the tendency to gel formation, impair the quality of the spinning solution and make subsequent working up more difficult.

(4) The catalyst residues not reacted during polymerisation can no longer be removed after polymerisation has been completed or terminated. They are therefore liable to cause undesirable reactions (producing low molecular weight polymers, discoloration) during the subsequent working up of the solution.

It is clear from what has been said above that the activity and other properties of the catalysts used determine to a large extent the reaction conditions but furthermore have a large influence on the factors of the commercial production and the quality of the spinning solutions, and therefore to a large extent determine whether the process can be used and whether it has any practical value.

To overcome or to diminish the above-mentioned difficulties, the catalysts should therefore be readily soluble in the reaction medium and be sufficiently active even at low concentrations to enable the desired polymerisation to be carried out at relatively high velocity even at low temperatures. Moreover, the spinning solutions which are formed must be pale, clear, free from gel and stable to discoloration and gel formation.

In the processes hitherto known, it was by no means possible to fulfill all these requirements simultaneously and completely. The use of boron trifluoride, azo compounds, inorganic and organic peroxides and the sodium salt of toluene sulphinic acid as catalysts for carrying out solution polymerisation of acrylonitrile in organic solvents has been proposed. When such catalysts were used, it was found that either both the yields of polymers and the molecular weights achieved were not sufficiently high (boron trifluoride) or high reaction temperatures and long reaction times were necessary (azo compounds and peroxides alone) in order to obtain commercially useful products. In the case of peroxides, especially in dimethylformamide solution, high reaction temperatures led particularly readily to undesirable discoloration of the solutions. Furthermore, when organic peroxides or alkali metal salts or sulphinic acids are used, it is found that these compounds have only a low solubility in the reaction medium and that when the components for polymerisation are brought together, and during the polymerisation, considerable quantities of salt are deposited which are either completely insoluble or can only be dissolved in the solvent at very high temperatures. The spinnability and stability of the spinning solutions are thereby considerably impaired. When alkali metal salts of sulphinic acid are used alone, the presence of certain quantities of atmospheric oxygen is necessary, and thus reduces the technical efficiency of the process.

When azo catalysts are used, atmospheric oxygen must be completely excluded owing to its inhibitory effect. For the same reason monomers containing polymerisation stabilisers (inhibitors) cannot be used directly; the stabilisers must first be removed, usually by distillation.

It has now been found that solution polymerisation or copolymerisation of acrylonitrile can be carried out at relatively high velocity and low temperatures by using a redox catalyst system consisting of (a) an organic peroxide, (b) a sulphinic acid salt of an organic base and (c)

a strong acid. Pale, clear spinning solutions free from gel are obtained which are stable to discolouration and gel formation.

The reaction mixture used for polymerisation contains 60 to 80 parts by weight of solvent, for example dimethylformamide in preferably 65 to 75 parts by weight, 20 to 40 parts by weight, preferably 25 to 35 parts by weight of the monomers and 0.05 to 0.5% by weight each of oxidising agent, reducing agent and acid which is preferably concentrated sulphuric acid. The ratio of oxidising agent to reducing agent may be in the region of 1:0.5 to 1:4. The mineral acids should be used in a molar excess of 1.2 to 4 times over the reducing agent. At reaction temperatures between 30 and 60° C., preferably at 35 to 45° C., a reaction time of 10 to 30 hours is required to obtain 65 to 85% conversion of the monomer into polymer. The polymers produced have a relative viscosity ($\eta_{rel}$) of 1.75 to 2.0 measured in a 0.5% DMF solution at 20° C. (K-value after Fikentscher: 75 to 85).

As oxidizing components of the redox system it is advantageous to use organic hydroperoxides, keto peroxides, acyl peroxides and acyl peroxide esters such as cumene hydroperoxide, tertiary butyl hydroperoxide, methyl ethyl ketone peroxide, cyclohexanone peroxide, lauroyl peroxide and in particular tertiary butyl permaleate are suitable for use as the oxidising components of the redox system. These peroxides and their decomposition products are readily soluble in the reaction medium.

Owing to their stability, ease of preparation, good solubility in the reaction medium and excellent activity, it is preferred to use salts of aromatic sulphinic acids, e.g. benzene sulphinic acid, p-chlorobenzene- and p-toluene-sulphinic acid, with morpholine, dimethylamine or diethylamine as the reducing components. The salts of naphthalene sulphinic acid or of aliphatic sulphinic acids with organic nitrogen bases such as dimethyl-, diethyl-, dibutyl-, dihexyl-, diethanolamine or morpholino can also be used.

Strong mineral acids which may be used are for example, hydrochloric acid, phosphoric acid, and preferably sulphuric acid. Suitable solvents for carrying out the polymerisation are dimethylformamide, dimethylacetamide, dimethylsulphoxide, ethylene carbonate and γ-butyrolactone.

If the reaction mixture comes into contact with material containing iron, the presence of oxalic acid has a particularly advantageous effect on the colour tone of the spinning solution.

The atmospheric oxygen dissolved in the reaction medium does not interfere with polymerisation, but the introduction of further quantities of oxygen must be prevented during the reaction. Monomers containing stabilisers such as thiosemicarbazide, ammonia or hydroquinone or derivatives thereof may also be put into the reaction without purification. The production of acrylonitrile polymers in form of a spinning solution is carried out by polymerizing a monomer composition containing from 80% to 100% acrylonitrile and up up to 20% of a copolymerisable ethylenically unsaturated compound in an organic polyacrylonitrile solvent. If, for example, 1 to 10%, preferably 5 to 7% of an acrylic ester, a vinyl ester or a styrene derivative are polymerised together with acrylonitrile, the solubility of the resulting polymer in the reaction medium increases considerably. It is thereby possible to use higher initial concentrations of monomer and achieve correspondingly high reaction velocities, molecular weight and polymer concentrations in the solution. Furthermore, the filaments obtained from the said copolymers are more readily dyed. To enable them to be dyed to deep colour tones, additional components having acid or basic groups, e.g., sulphostyrene, methacroylaminobenzene-benzene-disulphimide or vinyl pyridine may be copolymerised with the acrylonitrile.

When polymerisation is completed, a known polymerisation inhibitor is stirred into the solution. The formation of low molecular weight polymers during the subsequent working up of the solution can thereby be prevented. The solution is then spun by known dry or wet spinning processes, either immediately or after removal of the unreacted monomers, e.g. in a thin layer evaporator.

The polyacrylonitrile solutions prepared by the process according to the invention vary from colourless to pale yellow, clear and free from gel. After removal of the monomers, the solutions can be stored for many days without any significant increase in their viscosity taking place. The spun filaments have a high degree of whiteness, good thermostability and excellent textile properties. The following examples illustrate more particularly the invention.

Example 1

0.15 g. of tertiary butyl permaleate (in the form of a 50% solution in dimethylphthalate), 0.3 g. of the diethylamine salt of p-chlorobenzene sulphinic acid, 0.1 g. of oxalic acid and 0.2 g. of conc. sulphuric acid were dissolved in a mixture of 65 g. of dimethylformamide (DMF), 32.7 g. of acrylonitrile (AN) and 2.3 g. of methyl acrylate (AME). The reaction mixture, contained in a completely filled, closed, long-necked flask of 100 ml. capacity, was tempered in a water-bath at 40° C. After a reaction time of 20 hours, an almost colourless, clear, viscous solution having a polymer concentration of 24.5% was obtained which corresponded to a 70% polymerisation of the monomers. The relative viscosity of a 0.5% solution of the polymer in DMF at 20° C. was 1.81 (corresponding to a K-value after Fikentscher of 78.2).

Example 2

A reaction mixture consisting of 65 g. DMF, 32.7 g. AN, 2.3 g. AME, 0.15 g. methylethyl ketone peroxide (in the form of a 50% solution in dimethylphthalate), 0.3 g. of the morpholine salt of toluene sulphinic acid and 0.2 g of conc. sulphuric acid was polymerised at 45° C. for 17 hours in the same way as described in Example 1. At the end of polymerisation, the solution was clear and a pale yellow in colour and had a polymer concentration of 23% (conversion 66%). The polymer had a K-value of 81 ($\eta_{rel}$ 1.88).

Example 3

Polymerisation was carried out as in Example 2 except that this time 0.15 g. of tertiary butyl permaleate and 0.3 g. of the morpholine salt of p-chlorobenzene sulphinic acid were used as catalyst. A conversion of 74% was obtained after 15 hours. A K-value of 76 was found ($\eta_{rel}$ 1.76).

Example 4

The same monomer-DMF mixture as described in Examples 1 and 2 was mixed with 0.25 g. lauroyl peroxide, 0.25 g. of the morpholine salt of p-chlorobenzene sulphinic acid, 0.07 g. oxalic acid and 0.2 g. conc. sulphuric acid. Polymerisation took 20 hours at 45° C. The solution was almost colorless and clear. Conversion: 65%: K-value 83.6 ($\eta_{rel}$ 1.94).

Example 5

A V4A autoclave of 25 l. capacity, equipped with stirrer, thermometer and connections for vacuum and nitrogen was used as reaction vessel. The reaction mixture contained 13 kg. DMF, 6 kg. AN, 400 g. methyl acrylate, 70 g. methacroylaminobenzene-benzene-disulphonimide, 17 g. cumene hydroperoxide, 17 g. of the morpholine salt of toluenesulphinic acid, 15 g. conc. sulphuric acid and 10 g. oxalic acid. Polymerisation was carried out under a protective nitrogen pressure of 0.2 excess atmospheres and with slow stirring at 42 to 45° C. Samples were removed in the course of polymerisation to determine the rate of conversion and K-value (see table below).

| Sample No. | Time (hours) | Conversion (percent) | Solution concentration (percent) | $\eta_{rel}$ | K-value |
|---|---|---|---|---|---|
| 1 | 14 | 50.4 | 17.6 | 1.91 | 82.0 |
| 2 | 18 | 64.7 | 22.7 | 1.90 | 81.6 |
| 3 | 20 | 69.0 | 24.1 | 1.86 | 80.2 |

Polymerisation was stopped after 20 hours by the addition of a polymerisation inhibitor and the solution was then stirred intensively under a vacuum for 2 hours at 50° C. The pale yellow, clear solution was then spun by a known dry spinning process. The filaments could easily be stretched to a ratio of 1:7. They had a white tone in the crude state and very good thermostability and could readily be dyed with basic Astrazon dyes.

Example 6

Polymerisation was carried out in the same reaction vessel and with the same quantities of monomer and DMF as described in Example 5. The catalyst system used consisted of 20 g. butyl permaleate (50% solution in dimethylphthalate), 14 g. of the morpholine salt of p-chlorobenzene sulphinic acid, 5 g. oxalic acid and 14 g. conc. sulphuric acid. A pale, clear, 23% polymer solution (K-value 79.3) was obtained after 18 hours at 45 to 47° C. The solution was then separated from unreacted monomer which remained only as a residue of 0.9% by means of a thin layer evaporator and spun. After distillation, the solution had a polymer concentration of 29.4%. A sample left to stand at room temperature had not yet gelled after 2 days.

What we claim is:

1. A process for the production of polymers of acrylonitrile in the form of a spinning solution which comprises polymerizing 20-40 parts by weight of a monomer composition containing from 80-100% acrylonitrile and 0-20% of methyl acrylate in 60-80 parts by weight of an anhydrous organic solvent for said polymers of acrylonitrile in the presence of 0.05%-0.5% by weight of said monomer composition plus said solvent of a redox catalyst system consisting essentially of (a) an organic peroxide, (b) an aryl sulphinic acid salt of an amine selected from the class consisting of N,N-dialkyl amines, diethanolamine, and morpholine, and (c) sulfuric acid in proportions of 1 part by weight (a) per 0.5-4 parts by weight (b), and 1.2-4 moles (c) per mole of (b).

2. The process of claim 1 wherein said organic anhydrous solvent is selected from the class consisting of dimethylformamide, dimethylacetamide, dimethyl sulfoxide, ethylene carbonate, and gammabutyrolactone.

3. The process of claim 1 wherein said aryl sulphinic acid salt is a salt of an acid selected from the class consisting of benzene sulphinic acid, p-chlorobenzene sulphinic acid, p-toluene sulphinic acid, and naphthalene sulphinic acid, and said amine is selected from the class consisting of dimethylamine, diethylamine, dibutylamine, dihexylamine, morpholine and diethanolamine.

4. The process of claim 1 wherein said peroxide is selected from the class consisting of hydroperoxides, ketoperoxides, acyl peroxides, and acyl peroxide esters.

References Cited

UNITED STATES PATENTS 3,060,157   10/1962   Goodman.

MORRIS LIEBMAN, *Primary Examiner.*

H. H. FLETCHER, *Assistant Examiner.*

U.S. Cl. X.R.

260—30.8, 31.8, 32.6, 85.5, 88.7